US007930050B2

(12) United States Patent
Wertheimer

(10) Patent No.: US 7,930,050 B2
(45) Date of Patent: Apr. 19, 2011

(54) SYSTEMS AND METHODS FOR BEST-FIT ALLOCATION IN A WAREHOUSE ENVIRONMENT

(75) Inventor: David L. Wertheimer, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1850 days.

(21) Appl. No.: 11/021,860

(22) Filed: Dec. 23, 2004

(65) Prior Publication Data

US 2006/0143030 A1 Jun. 29, 2006

(51) Int. Cl.
*G06F 19/00* (2011.01)
*G06Q 10/00* (2006.01)

(52) U.S. Cl. ............. 700/99; 700/28; 700/107; 705/1.1; 705/28

(58) Field of Classification Search .................... 700/99, 700/103, 107, 28; 705/1, 5, 8, 9, 22, 28, 705/29, 1.1; 707/661, 705, 803
See application file for complete search history.

(56) References Cited

U.S. PATENT DOCUMENTS

| | | | |
|---|---|---|---|
| 5,249,120 A | 9/1993 | Foley | |
| 5,675,785 A | 10/1997 | Hall et al. | |
| 6,356,880 B1 | 3/2002 | Goossens et al. | |
| 6,744,436 B1 | 6/2004 | Chirieleison et al. | |
| 6,829,604 B1 | 12/2004 | Tifft | |
| 6,904,449 B1 | 6/2005 | Quinones | |
| 6,920,366 B1 * | 7/2005 | Luh et al. | 700/101 |
| 7,130,807 B1 | 10/2006 | Mikurak | |
| 7,177,834 B1 | 2/2007 | Maestle | |
| 7,200,589 B1 | 4/2007 | Graupner | |
| 7,302,409 B2 | 11/2007 | Hayashi | |
| 2002/0107864 A1 | 8/2002 | Battas et al. | |
| 2002/0111886 A1 | 8/2002 | Chenevich et al. | |
| 2003/0002445 A1 | 1/2003 | Fullana et al. | |
| 2003/0018516 A1 | 1/2003 | Ayala et al. | |
| 2003/0018546 A1 | 1/2003 | Ayala et al. | |
| 2003/0083888 A1 | 5/2003 | Argenton et al. | |
| 2003/0115080 A1 | 6/2003 | Kasravi et al. | |

(Continued)

FOREIGN PATENT DOCUMENTS

EP 1362542 A1 11/2003

OTHER PUBLICATIONS

Ghosh, Diptesh et al., "A Competitive Local Search Heuristic For The Subset Sum Problem," Computers & Operations Research, vol. 26, pp. 271-279, 1999.

(Continued)

*Primary Examiner* — Kidest Bahta
*Assistant Examiner* — Sheela Rao
(74) *Attorney, Agent, or Firm* — Kilpatrick Townsend & Stockton LLP

(57) ABSTRACT

In accordance with some embodiments of the invention, an optimal allocation of items to meet a particular order is calculated. The items, then, may be allocated to the order according to the calculated allocation. In one set of embodiments, a procedure may be implemented to allocate items so as to provide an amount of material closest to the ordered amount. In another set of embodiments, a procedure may be implemented to allocate items so as to minimize the number of items chosen while still remaining within a tolerance for the order (which may be established by customer policy, company policy, etc.).

29 Claims, 4 Drawing Sheets

100

IDENTIFY REQUESTED QUANTITY ($Q_R$) — 105

DEFINE TOLERANCE ($T_H$, $T_L$) — 110

DEFINE CONTROL VALUE ($N$) — 115

IDENTIFY AVAILABLE ITEMS — 120

GROUP AVAILABLE ITEMS — 125

SOLVE FOR BEST SOLUTION (Q) — 130

ALLOCATE Q TO ORDER — 135

U.S. PATENT DOCUMENTS

| | | | | |
|---|---|---|---|---|
| 2003/0120504 | A1 | 6/2003 | Kruk et al. | |
| 2003/0172008 | A1 | 9/2003 | Hage et al. | |
| 2003/0216977 | A1 | 11/2003 | Hayashi | |
| 2004/0254825 | A1 * | 12/2004 | Hsu et al. | 705/8 |
| 2006/0155655 | A1 | 7/2006 | Shen | |
| 2007/0239569 | A1 | 10/2007 | Lucas et al. | |
| 2009/0070353 | A1 | 3/2009 | Chorley et al. | |
| 2009/0089078 | A1 | 4/2009 | Bursey | |

OTHER PUBLICATIONS

"Oracle Warehouse Management", Oracle Data Sheet, Jul. 26, 2002, 4 pages.

Amazon Web Services, "Amazon Elastic Compute Cloud (Amazon EC2)", obtained May 5, 2009 online at http://aws.amazon.com/ec2/, 7 pages.

Amazon Web Services, "Amazon Machine Images (AMI's)", obtained May 5, 2009 online at http://developer.amazonwebservices.com/connect/entry.jspa?externalID=, 1 page.

Amazon Web Services, "Amazon Machine Images (AMI's)", obtained May 5, 2009 online at http://developer.amazonwebservices.com/connect/entry.jspa?externalID=, 2 page.

U.S. Appl. No. 10/158,176, filed May 29, 2002, Office Action mailed Sep. 29, 2004, 11 pages.

U.S. Appl. No. 10/158,176, filed May 29, 2002, Office Action mailed May 12, 2005, 11 pages.

U.S. Appl. No. 10/158,176, filed May 29, 2002, Final Office Action mailed Oct. 24, 2005, 11 pages.

U.S. Appl. No. 10/158,176, filed May 29, 2002, Office Action mailed Jun. 7, 2006, 11 pages.

U.S. Appl. No. 10/158,176, filed May 29, 2002, Final Office Action mailed Nov. 30, 2006, 14 pages.

U.S. Appl. No. 10/158,176, filed May 29, 2002, Office Action mailed Jul. 2, 2007, 11 pages.

U.S. Appl. No. 10/158,176, filed May 29, 2002, Final Office Action mailed Dec. 20, 2007, 12 pages.

U.S. Appl. No. 10/158,176, filed May 29, 2002, Office Action mailed Jun. 26, 2008, 13 pages.

U.S. Appl. No. 10/158,176, filed May 29, 2002, Final Office Action mailed Jan. 29, 2009, 13 pages.

U.S. Appl. No. 10/158,176, filed May 29, 2002, Advisory Action mailed Apr. 10, 2009, 3 pages.

U.S. Appl. No. 10/158,176, filed May 29, 2002, Office Action mailed May 13, 2009, 10 pages.

U.S. Appl. No. 10/158,176, filed May 29, 2002, Final Office Action mailed Dec. 23, 2009, 11 pages.

U.S. Appl. No. 10/158,176, filed May 29, 2002, Notice of Allowance mailed Apr. 16, 2010, 9 pages.

* cited by examiner

SYSTEMS AND METHODS FOR BEST-FIT ALLOCATION IN A WAREHOUSE ENVIRONMENT

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to computer systems and more particularly, to computer systems for use in a warehouse environment.

In recent years, ever more attention has been paid to efficient allocation of items in supply management systems. Such systems, which can include warehouse management systems, supply chain management systems, inventory management systems, enterprise resource planning systems, and the like, all are dedicated to allowing organizations to more efficiently allocate scarce resources among competing purposes. Merely by way of example, modern warehouse management systems ("WMS") often are complex software packages that run on top of a relational database management system ("RDBMS"), such as the Oracle 10g™ RDBMS. Oracle Warehouse Management™ is one example of such a package.

One goal of a WMS application is to most efficiently allocate bulk items. As a simple example, if a customer orders 5200 linear feet of a particular material with a tolerance of ±100 feet, and the material is available in rolls of 250 linear feet, a WMS might allocate 21 rolls of the material to the order, resulting in an overallocation of 50 linear feet, which falls within the customer's tolerance. In many cases, however, the task of allocation is not so simple. Merely by way of example, items often are available in a variety of sizes, so that, in the example above, there might be 10 50-foot rolls, 20 60-foot rolls, and 15 100-foot rolls of the material available. Even this example is over-simplified, however, since most real manufacturing and/or warehousing environments will have thousands of items (such as rolls, pallets, or drums of material), with substantial variation among the items (in terms of the quantity of material each item contains.

Merely by way of example, in a manufacturing environment with high variability, such as in the manufacture of steel coils, paper rolls, chemicals, etc. there is frequently significant variation in the size of the item (batch, pallet, roll, etc.) that rolls off the manufacturing line. For instance, though one may expect 1000 lbs. of steel per pallet, the variability may mean that sequential items weigh anywhere from 700 lbs. to 1300 lbs. As warehouse processes often require a close match between a material request and the items that are used to fulfill that request, this variability makes it difficult to select the right combination of items that come closest to the requested quantity, particularly when the request itself also allows variability. For instance, if a customer ordered 13,700 lbs. of steel, but allows over- or under-shipment of up to 4%, finding an optimal allocation of pallets presents a non-trivial problem. The problem is further complicated because "optimal" can be defined in a variety of ways. Merely by way of example, one optimal solution might be the selection of items that come closest to the requested quantity but, under no circumstances exceeds the upper tolerance. Another optimal solution, however might seek to minimize the total number of items that fall within the requested tolerance.

Typically, this problem is addressed in one of three ways. First, it can be modeled as a binary programming problem, with costs attached to number of items and the deviation of the solution from the requested quantity. These weights can be varied depending on the type of solution desired, and then the entire problem can be solved using the branch-and-bound variation of the simplex algorithm. While this approach often produces highly accurate solutions, it is computation-intensive and often is unacceptably slow when the number of items is large, which makes it unusable when hundreds or thousands of separate material requests need to be allocated in a short period.

An alternate approach is to use a very simplistic heuristic, allocating items in a "greedy" fashion in some basic user- or system-defined sequence, such as largest items first, until no more items can be added. While this approach tends to require relatively low computation power, it often produces low quality solutions that are not necessarily either the fewest number of items, or very close to the requested quantity.

As a third approach, if the tolerances and desire to reduce the number of items allocated can be ignored, the allocation of items can be modeled as a classical optimization problem called the "subset-sum" problem, where the goal is to find the subset of numbers among a larger set of numbers whose sum is the largest possible amount, so long as it is equal to or below a certain target value. There has been considerable research into the subset-sum problem, and many successful heuristics have been developed using this approach. As noted above, however, the subset-sum approach does not account either for tolerances in the target value or for the need to minimize total numbers used, however, and thus fails to produce optimal solutions in a typical manufacturing/warehousing environment, in which customers often tolerate variation from a stated order size, and in which efficiency concerns often dictate that a minimum number of items be allocated to any given order.

Hence, there is a need in the art for more robust methods and systems for allocating items.

BRIEF SUMMARY OF THE INVENTION

Various embodiments of the invention provide devices, software, methods, and systems, including without limitation warehouse management systems, that can provide relatively efficient allocation of items to orders for those items. In accordance with some embodiments, for example, an optimal allocation of items to meet a particular order is calculated. The items, then, may be allocated to the order according to the calculated allocation. In one set of embodiments, a procedure may be implemented to allocate items so as to provide an amount of material closest to the ordered amount. In another set of embodiments, a procedure may be implemented to allocate items so as to minimize the number of items chosen while still remaining within a tolerance for the order (which may be established by customer policy, company policy, etc.).

One set of embodiments, for example, provides methods of allocating items to an order and/or of fulfilling an order. Such methods may be implemented, inter alia, in a warehousing and/or manufacturing environment. An exemplary method may comprise identifying an order and/or determining a tolerance for the order. The order may comprise a requested quantity of material (which can be any of a wide variety of materials, in accordance with various embodiments of the invention), and/or the tolerance may define a variation from the requested quantity, such that a provided quantity within the tolerance might still be acceptable for the order (e.g., an absolute quantity by which the fulfillment may vary from the requested quantity, a relative value, such as a percentage, from the requested quantity by which the fulfillment may vary from the requested quantity, etc.). In various embodiments, the tolerance might be specified by the order, defined by a rules engine of a warehouse management system, etc.

In accordance with some embodiments, the method further comprises identifying a set of items, which may, in particular aspects, be available for use to fulfill the order. Merely by way of example, the set of items might comprise a plurality of items available for allocation. The availability of such items might depend on a variety of factors, including without limitation, the location of the items, the allocation status of the items with respect to other orders, etc. In some cases, the items may be identified based on a rule implemented, e.g., by a rules engine of a warehouse management system. In other cases, identifying the set of items may comprise searching a database (such as a relational database, etc.) for available items.

Some methods may comprise calculating (e.g., with a computer) a first allocation of one or more of the items available for allocation. The first allocation may be based on the requested quantity of material. In particular embodiments, the method may further comprise calculating a second allocation of one or more items. The second allocation may be based on a target value, which may lie within the tolerance (i.e., the target value, in some cases, might not vary from the requested quantity of material by more than the tolerance, whether absolute, relative or otherwise). In some cases, the target value may be the sum of the requested value and the tolerance. Merely by way of example, if the requested quantity is 100 yards of material, and the tolerance is ±20%, the target value may be 120 yards of material.

In one set of embodiments, calculating the second allocation might further comprise resetting the target value and/or calculating an alternative allocation based on the reset target value. In some cases, these procedures may be performed iteratively to produce a plurality of alternative allocations, and/or a best of the plurality of alternative allocations may be selected as the second allocation. Optionally, the number of iterations may be controlled, e.g., with a control value (which might specify a maximum number of iterations, such that the number of iterations performed does not exceed the control value). Resetting the target value, in some cases, then may comprise adjusting the target value by an amount calculated from the control value. Merely by way of example, if the control value is 5, and an initial target value comprises 120 (which, as noted above, might be the case if the requested quantity is 100 and the tolerance is ±20%), the reset target value might be 116, which could represent the sum of the requested quantity and a value represented by the tolerance (perhaps expressed as an absolute value of 20) divided by the control value minus one. As another example, using the same numbers, the reset target value might be 115, representing the sum of the requested quantity and the quotient of the tolerance divided by the control value itself Other calculations are possible as well.

In accordance with various embodiments of the invention, a variety of procedures may be used to calculate the first and/or second allocations. Merely by way of example, in a particular set of embodiments, a subset-sum heuristic may be used to perform such calculations. (It should be noted that different procedures may be used to perform the first and second calculations, respectively, although in many cases the same procedure may be used for each.)

The first allocation may be compared with the second allocation to find a best allocation between the two. In particular embodiments, the best allocation may be considered the allocation that allocates the fewest number of items to the order, and comparing the first allocation with the second allocation therefore may comprise determining which, of the first and second allocations, comprises a fewest number of items. The best allocation then may be allocated to the order (e.g., by updating a database to associate the items with the order, by labeling, packaging and/or shipping the items, etc.).

In a particular set of embodiments, the available items might be grouped into a plurality of groups. Merely by way of example, a first group may be formed comprising a plurality of items, each of which comprises a quantity of material greater than a first threshold value, and/or a second group may comprise another plurality of items, each of which comprises a quantity of material greater than a second threshold value but not greater than the first threshold value. In such embodiments, the first and second allocations may be calculated from among a first group of items.

Optionally, an additional quantity of items may be allocated to the order. Merely by way of example, a third allocation and/or a fourth allocation may be calculated from among a second group of items, perhaps as described with respect to the calculation of the first and second allocations, respectively. The third and fourth allocations may be compared to determine a best additional allocation of items, which then may be allocated to the order.

Other sets of embodiments provide systems and software programs. Merely by way of example, an exemplary system may comprise one or more computers configured to perform methods of the invention. A particular system may comprise a database, and/or one or more of the computers may comprise a relational database management system in communication with the database and/or a warehouse management system in communication with the relational database system. An exemplary software program may be embodied on a computer readable medium and/or may comprise instructions executable by one or more computers to perform methods of the invention.

BRIEF DESCRIPTION OF THE DRAWINGS

The invention has been briefly summarized above. A further understanding of the nature and advantages of the invention may be realized by reference to the figures, which are described in detail below. In the figures, like reference numerals may be used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

1. Overview

Figure 1A:
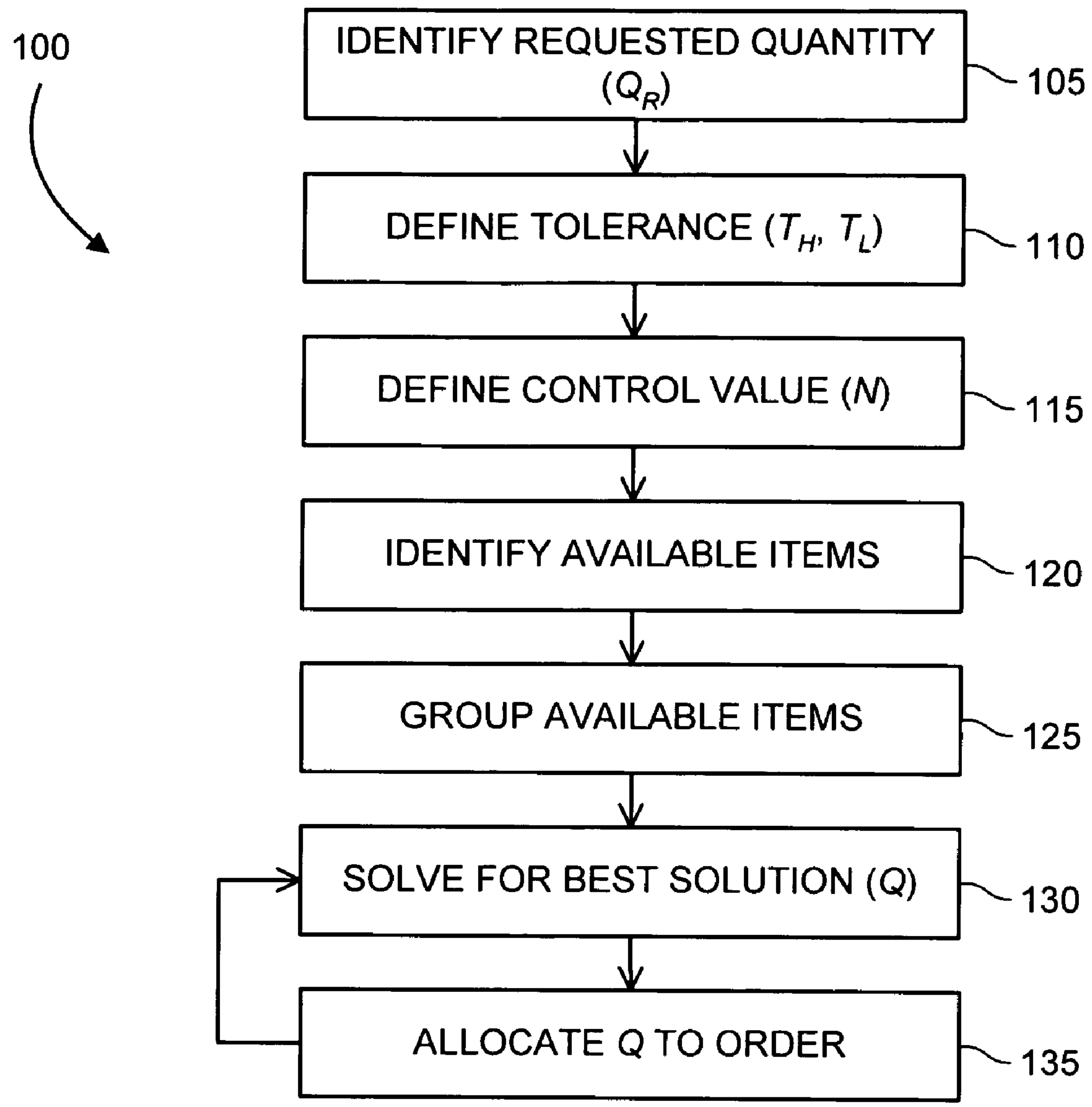
FIGS. 1A and 1B collectively illustrate a method for allocating items, in accordance with embodiments of the invention.

Various embodiments of the invention provide devices, software, methods, and systems, including without limitation warehouse management systems, that can provide relatively efficient allocation of items to orders for those items. In accordance with some embodiments, for example, an optimal allocation of items to meet a particular order is calculated. The items, then, may be allocated to the order according to the calculated allocation. In one set of embodiments, a procedure may be implemented to allocate items so as to provide an amount of material closest to the ordered amount. In another set of embodiments, a procedure may be implemented to allocate items so as to minimize the number of items chosen while still remaining within a tolerance for the order (which may be established by customer policy, company policy, etc.).

Hence, in accordance with some embodiments of the invention, items may be selected in order to fill an order. As used herein, the term "item" can refer to any unit of material that is to be allocated. Usually (but not always), an "item" is a unit of manufacture, distribution and/or storage of a bulk material. Examples of items can include, without limitation, cases, pallets, rolls, sheets, drums, containers, boxes, etc. In some cases, units may be subdividable, (so that, for instance, a roll may be subdivided into two smaller rolls, but in many cases it may be inefficient or otherwise undesirable to subdivide units. Material can be virtually anything that is to be allocated, particularly (but not always) in a manufacturing and/or warehousing context. Examples of material can include, without limitation, raw and/or processed materials (such as steel, wood, other building materials, etc.), chemicals, manufactured items, retail items, etc. The term "order" likewise should be interpreted broadly to mean any allocation of items, whether to fulfill a customer's order, to fulfill internal allocation needs (e.g., for allocation among various warehouses, etc.), and the like.

Selecting the best combination of items to come close to a requested quantity is similar to a classical optimization problem called the "subset-sum" problem. That is, find the subset of numbers in a larger set of numbers whose sum is the largest possible amount, so long as it is equal to or below a certain target value. In fact, in one set of embodiments, a subset-sum algorithm may be used to find an initial solution, which then may be refined by further processing. In an aspect of such embodiments, any of a variety of known subset-sum solutions may be used to find an initial selection of items that is at or below the requested quantity. Merely by way of example, in accordance with particular embodiments, the subset-sum solution described in Ghost, Diptesh and Chakravarti, Nilotpal, "A Competitive Local Search Heuristic for the Subset Sum Problem," (available from Indian Institute of Management Calcutta, P.O. Box 16757, P.O. Alipore, Calcutta 700027, India), which is incorporated herein by reference, can be used as a subset-sum algorithm to find an initial solution, though any alternative heuristic that finds good candidate solutions to the subset sum problem may be used as well.

In accordance with some embodiments, therefore, any appropriate subset-sum solution can be used to determine an initial allocation of items to meet a requested quantity (e.g., a quantity specified in a particular order). Suppose the requested quantity is c, and the initial allocation (based, for example, on the subset-sum solution) is z−. If c=z−, then no allocation will come closer, and this can be considered the solution. However, if c<z−, then there may be a selection of items that comes closer to c than z−, but instead overallocates (with respect to the requested quantity) instead of underallocating. The same heuristic can then be repeated, except now with a "requested" quantity (or target) of c+(c−z−); that is, trying to find a solution closer to the requested quantity c.

If, however, the new target is above the upper limit of the requested quantity that will be accepted, the heuristic instead might be repeated to solve for min(c+(c−z−), upper limit). Moreover, a solution that is exactly equal to this value is no better than the current solution, so in some embodiments, the heuristic may be further refined to specify that a solution must actually be closer, so instead, the heuristic should be repeated with min(c+(c−z−)−Δ, upper limit), where Δ is a relatively small number, which may be equal to the precision with which the items are measured. If this second iteration produces an allocation z+ that is equal to or below the requested quantity, then it can be assumed that no better solution than max(z−, z+) can be found. If, however, this second iteration allocates more than the requested quantity c then it is, by the way in which the input parameters were defined, closer to the requested quantity than z−. So z+ can be considered the new "best" solution. There may be, in fact, a solution even closer to the requested quantity than this solution. To determine whether there exists a closer solution, the heuristic may be repeated with a smaller and smaller requested quantity, each time coming closer to c than the previous z+, until either a pre-defined maximum number of iterations has been reached, or the last z+ is, in fact, below c. At that point, the "best" solution, in the sense of coming closest to the requested quantity, may be found by comparing the overallocation and underallocation solutions that had the smallest deviations.

In another set of embodiments, it may be desirable to select the smallest number of items that satisfy the requested amount (again within the specified tolerance), rather than the smallest deviation among all possible items. In such cases, a similar solution may be used. Specifically, the items that are being considered by the above heuristic can segmented into a plurality of groups of items, ranging from a group of the "largest" items (i.e., items containing the greatest amount of material) to a group of the "smallest" items (i.e., items containing the least amount of material).

The heuristic described above, then, may be implemented, but as an initial matter, only with respect to the group of the largest items. Hence, in certain embodiments, only if the best allocation from this approach is below the lower limit should the next largest group of items be considered to fill in the gap. Groups of smaller and smaller items can be incrementally considered until the allocation is within the tolerance. In particular embodiments, these groups of relatively smaller items are considered only if the allocation is below the lower tolerance.

The criteria for segregating or grouping the items into properly sized groups are discretionary. In accordance with some embodiments, items may be segregated into a number of groups that maintains the quality-of-solution characteristics inherent in the basic heuristic above, yet reasonably reduces the number of items in the solution. Specifically, if the items are segregated into too many groups so that each group has one item or only a few items, the heuristic may perform no better than a simple greedy heuristic, while if they are segregated into too few groups so that there is only one large group, this may provide no advantages over the non-grouping approach described above. In accordance with some embodiments, items are segregated into groups according to any naturally occurring splits, such as might happen if material from a manufacturing line were completed into different container types. The container type, then, could be used to differentiate the groups. In other embodiments (for example, in cases in which there exists no such natural division) an arbitrary segregation can be performed, e.g., based on the maximum number of items to go in each group (e.g., no group should include more than 100 items), a pre-defined size division between each group (e.g., the item groups should be (∞, 1000], (1000, 500], (500, 0]). These criteria, which may be user-defined, often are based on the desired performance characteristics of the heuristic and domain expertise on the variability intrinsic to specific manufacturing process being used.

In some embodiments, for each of the heuristics described above, the list of available items might be further restricted, thus rendering some items that technically are available for allocation (or partial allocation) unavailable for the selection process. Merely by way of example, a rule might specify that only items that can be wholly allocated should be considered, thus excluding items that are partially reserved for different material requirements, or that have attributes that make that item undesirable for the request. Based on the disclosure herein, one skilled in the art would appreciate that a variety of rules may be implemented in this way. Merely by way of example, commonly-owned, copending U.S. patent application Ser. No. 10/158,176, entitled "Rules Engine for Warehouse Management Systems" and filed May 29, 2002, by Chorley et al., the entire disclosure of which is incorporated herein by reference, discusses some exemplary rules and methods of implanting them. Finally, in some embodiments, the list of items may be restricted to a user-defined size (e.g., only include the first 400 available items, where "first" may be defined—for example, by a rule in a rules engine, such as the rules engine discussed in U.S. patent application Ser. No. 10/158,176, already incorporated by reference—as appropriate, e.g., based on location of item, size of item, another characteristic, etc.), so that the worst-case performance (e.g., in terms of execution time, etc.) of the heuristic can be limited.

The discussion below of several exemplary embodiments describes additional details and features of certain embodiments of the invention.

2. Exemplary Embodiments

One set of embodiments provides methods, including without limitation methods for managing and/or allocating resources. In particular, certain methods of the invention may be used for efficiently managing and/or allocating items in a warehouse environment. An exemplary method 100 is illustrated by FIG. 1. The method 100 can comprise identifying an order quantity (block 105). In some embodiments, as described in more detail below, the method 100 may be implemented in a WMS, which may utilize a database and/or operate in conjunction with an RDBMS. Identifying a requested quantity, therefore, may comprise identifying an order and/or identifying a quantity of material associated with that order. As noted above, in accordance with various embodiments, an order can be any of a variety of things, including without limitation a customer order, a re-supply order, a material reallocation request, etc. Based on the disclosure herein, those skilled in the art will appreciate that there are a variety of ways an order can be identified for fulfillment in a WMS. Merely by way of example, one or more orders may be queued and/or each order may be scheduled for automatic fulfillment in its turn. Alternatively, an operator may identify an order within a WMS for fulfillment, and/or may identify a specific quantity for fulfillment.

Other embodiments of the invention, however, may not be implemented within a WMS and/or an RDBMS. In such embodiments, for example, a database (or some other data store) might maintain a list of items available for allocation, and/or an operator might manually input a requested quantity of material for fulfillment. Hence, it can be seen that identifying a requested quantity of material can comprise one or more of a variety of procedures, so long as a requested quantity is identified.

In accordance with some embodiments, the method 100 may further comprise defining a tolerance with respect to the requested quantity (block 110). As noted above, an order, in addition to comprising a requested quantity of material, often comprises a tolerance for variation from the requested quantity. This tolerance might be specified by the entity placing the order (e.g., a customer, etc.). Alternatively, the tolerance might be system-defined and/or specified by an operator of the system. In such cases, the tolerance might be defined globally (e.g., each requested quantity of material is assigned a tolerance of ±5%, etc.), specified based on the type of material and/or items requested, specified based on the requested quantity (e.g., relatively smaller orders have no tolerance for variation, while relatively larger orders have some tolerance, or vice-versa), defined based on the relative value of the ordering entity (e.g., orders from valued and/or frequent customers are assigned a certain tolerance, while orders from infrequent customers are assigned a different, perhaps higher, tolerance, etc.), and/or defined in other ways. Merely by way of example, in a set of embodiments, the tolerance might be defined by a set of one or more configurable rules related to the entity placing the order (e.g., when an order is used to supply material to a manufacturing floor, different types of jobs may have different tolerances for material requirements, based, perhaps, on characteristics of the manufacturing processes for each respective job, etc.). Based on the disclosure herein, one skilled in the art will appreciate that there are a wide variety of ways in which a tolerance might be defined for any particular order and/or requested quantity of material.

In accordance with embodiments of the invention, the tolerance may be expressed in a variety of ways. Merely by way of example, the tolerance may be relative to the requested quantity, such that the order requests X units of material ±Y %. Alternatively, the tolerance may be expressed in absolute terms, such that the order requests X units of material ±Y units. In some cases, the tolerance may be symmetrical (such that an equal magnitude of over- or underallocation is tolerated), while in other cases, the tolerance may be asymmetrical (e.g., some overallocation is permitted, but no underallocation, and/or different magnitudes may be allowed for under- versus overallocation).

The method can further comprise defining a control value (block 115). In accordance with some embodiments of the invention, as described generally above and in more detail below, the method 100 may utilize an iterative calculation for determining a best-fit allocation for a requested order. The control value, in some cases, defines the number of iterations that should be performed in finding the best-fit allocation. Based on the disclosure herein, one skilled in the art will appreciate that the control value functions to balance the allocation process between competing goals of optimal allocation (e.g., allocation closest to the requested quantity, fewest items allocated, etc.) and expeditious processing. Hence, the definition of the control value often will depend on several factors, including without limitation the number of items available, the desired precision of the allocation heuristic, constraints based on available processing power and/or memory, etc. In any event, the definition of the control value is discretionary and generally will vary from implementation to implementation.

At block 120, available items may be identified. In accordance with embodiments implemented in conjunction with a WMS and/or a RDBMS, the WMS and/or RDBMS may include a table (and/or any other appropriate data structure) that tracks available items. In such embodiments, such the WMS and/or RDBMS may be queried (using a SQL query, etc.) to determine available items. Other methods of identifying available items may be used as well. Merely by way of example, a list of available items may be maintained in a flat file, etc., and such a list may be consulted to determine available items.

As noted above, in some cases, some items that are technically available (e.g., present in an RDBMS) may not be considered available for allocation by the method 100 described here. Merely by way of example, in some implementation, it may be undesirable to consider for selection items already partially allocated to another order. As another example, certain characteristics of a particular item (e.g., the amount of material in the item, the location of the item, etc.) may render the item unsuitable for selection. Hence, identifying available items may take such considerations into account. In some cases, this may be done in conjunction with a WMS and/or an RDBMS, and/or in particular cases, in conjunction with a rules engine (such as, for example, the rules engine of U.S. patent application Ser. No. 10/158,176, already incorporated by reference), which might define and/or implement rules governing the availability of a particular item and/or group of items. For example, if an item has been allocated to one order, a record of the item may still be within the WMS and/or RDBMS, but the WMS and/or RDBMS may have marked the item as "allocated," "partially allocated," etc. A query used to identity available items may be structured to ignore such items, using any procedure or convention known in the art.

In accordance with certain embodiments, the available items may be grouped into one or more (and, generally, two or more) groups (block 125). Merely by way of example, as noted above, a particular embodiment of the invention may perform a first pass of an allocation heuristic using a first group of items, and, if the first pass underallocates items to the order, perform a second pass with a second group of items, and so on, until an optimal solution has been obtained and/or the groups have been exhausted. (In some cases, for example, the first pass may consider only a group of the largest available items, the second pass may consider a group of the next largest available items, etc.) In some embodiments of the invention, the iterative process will proceed to subsequent groups of items only if the allocation is below the lower tolerance of the requested quantity (i.e., $Q_R-T_L$), while in other embodiments, the iterative process will proceed if the allocation is below the requested quantity, $Q_R$ (i.e., even if the allocation is within the lower tolerance $T_L$). The number of groups is discretionary (and is often based, again, on competing considerations of computing efficiency and solution precision). Any appropriate procedure for forming groups (including without limitation the procedures described above) may be used, in accordance with various embodiments of the invention.

The method 100 may include obtaining a best solution Q that satisfies the order (block 130). A variety of techniques may be used to obtain this solution Q. For instance, a subset-sum heuristic (including without limitation the heuristics described above) may be used to find a best solution Q. As another example, a "greedy" solution may be used, e.g., as described above. In accordance with certain embodiments, however, a more refined technique may be used.

Figure 1B:
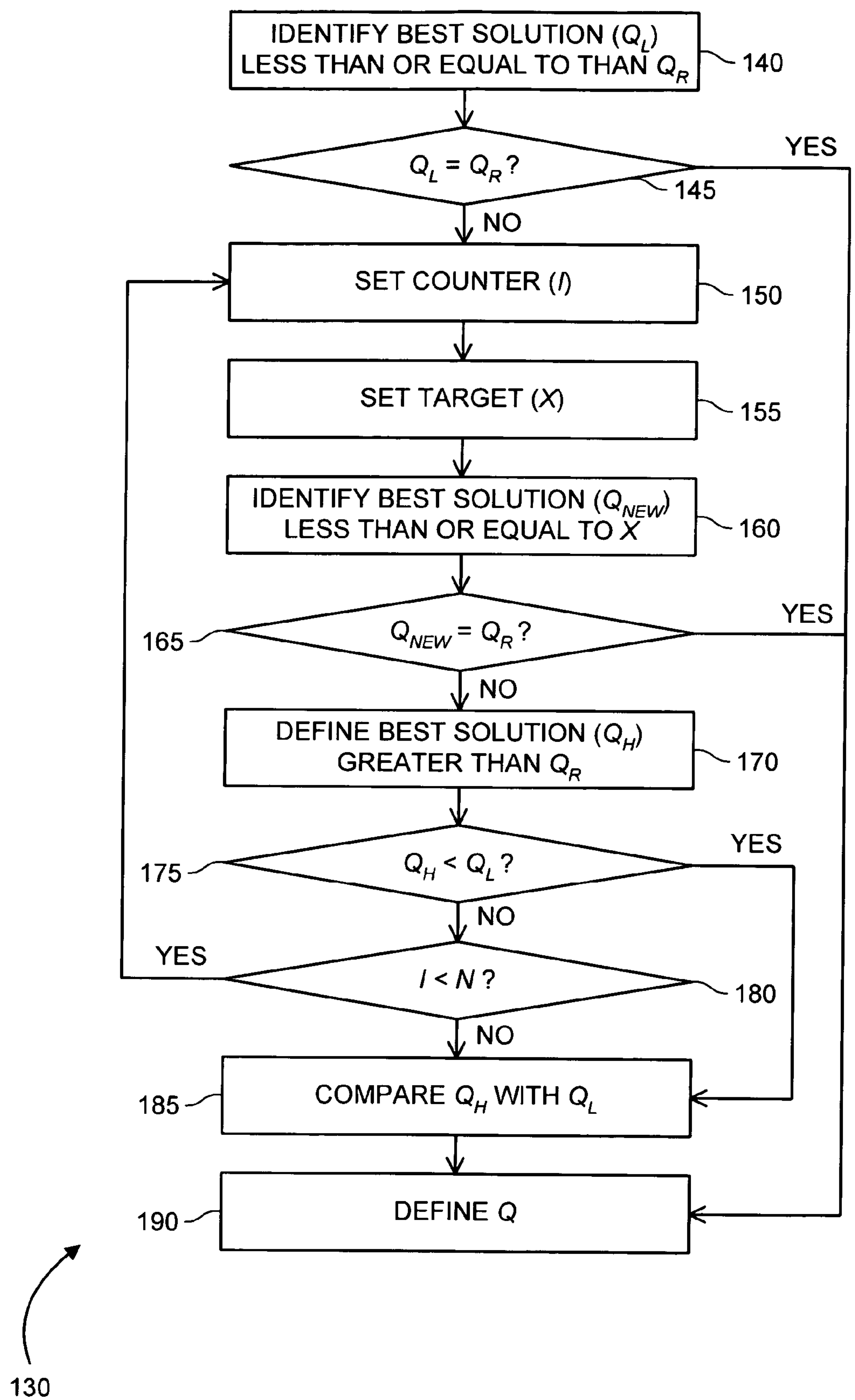

Merely by way of example, FIG. 1B illustrates a procedure 130 for obtaining a best solution Q in accordance with a set of embodiments. In particular embodiments, the procedure 130 may comprise solving for a "best" solution, using as a target the requested quantity of items (denoted on FIG. 1B as $Q_R$) (block 140). This solution, (denoted on FIG. 1B as $Q_L$) generally will produce an allocation of available items that is less than or equal to the requested quantity $Q_R$, and/or, depending on the characteristics of the heuristic used, typically, but not always, is also the closest possible allocation of items to the requested quantity. A variety of procedures may be used to find $Q_L$. Merely by way of example, as described above, a subset-sum heuristic may be used for this purpose. Alternatively, a "greedy" solution may be implemented. In some cases, this solution $Q_L$ might meet the requested quantity $Q_R$ exactly (e.g., to within some acceptable precision, which should not be confused with the tolerance, as described above—for example, it may be impossible to measure an exact quantity of material, so that the material is measured to the nearest 500 grams, while the tolerance may be 10 kilograms, so that if $Q_L$ is within 500 grams of $Q_R$, it is considered an "exact" fit), such that $Q_L=Q_R$. This condition may be tested (block 145), and if true, it is apparent that no better solution exists, and the combination representing $Q_L$ can be defined as the best possible solution Q (block 190).

Even if not an exact fit for $Q_R$, this solution $Q_L$ might be considered a "best" solution to the allocation problem, in accordance with traditional allocation procedures. As described above, however, it is possible that better solutions might exist; merely by way of example, one or more available solutions might allocate items over the requested quantity $Q_R$ but within the tolerance $T_H$ (or more precisely, within the interval $(Q_R, Q_R+T_H)$). Such solutions might comprise fewer items than $Q_L$ and therefore could be considered, at least in some cases, a "better" solution than $Q_L$. Alternatively, it may be that $Q_L$ is below $Q_R-T_L$, and thus outside of the lower tolerance, and so any allocation within the tolerance of $Q_R+T_H$ is a "better" solution. Particular embodiments of the invention can be configured to find such solutions, thereby maximizing the efficiency with which items may be allocated. In accordance with some embodiments, then, a solution may be found for the best fit within the upper tolerance $T_H$, since an allocation provided by such a solution would still be considered acceptable for the order and might provide a better solution (e.g., an allocation comprising fewer items). Any appropriate heuristic may be used to find such a solution; merely by way of example, the subset-sum heuristic may be implemented.

In a set of embodiments, a heuristic (which might be, for example, the same heuristic that is used to find the best solution $Q_L$ for the requested quantity $Q_R$) may be used iteratively to find the best fit within the upper tolerance. One such iterative procedure, which is featured in some embodiments, is illustrated by FIG. 1B. As described above, a control value N may be used to control the number of iterations that are performed. The iterative procedure, then, can include setting a counter I (block 150), which may be used, as appropriate, to keep track of the number of iterations performed. In accordance with some embodiments, then, the counter I may initially be set at an arbitrary value (e.g., 1) prior to (or upon) performing the first iteration, and/or the counter I may be suitably incremented thereafter, for example, as described in more detail below.

In accordance with certain embodiments, the procedure 130 attempts to obtain a solution that overallocates (with respect to the requested quantity $Q_R$), but still falls within the upper tolerance $T_H$. Accordingly, a target value X for the solution may be set (block 155). (The initial value of X may be denoted as $X_i$) In particular embodiments, the target value initial value $X_i$ may be set to a value equal to $(Q_R+T_H)$, which will produce an overallocation solution within the upper tolerance, assuming the use of a heuristic (such as the subset-sum heuristic) that produces a solution less than the target value. (Of course, other heuristics may be used as well, and in such cases, the initial target value $X_i$ may be set accordingly, depending on the characteristics of the solution.) In a particular set of embodiments, it may be desirable to use a more refined process for setting the initial value $X_i$ of the target X. Merely by way of example, if a goal is to emphasize precision of allocation to the requested quantity $Q_R$, there may be no need to seek solutions within the upper tolerance $T_H$ that allocate material (with respect to $Q_R$) less precisely than does the solution $Q_L$ calculated earlier. Hence the target X might be set initially to find an overallocation of items that varies from the requested quantity no more than $Q_L$. In particular embodiments, the target X might be further constrained to be within the upper tolerance $T_H$. Thus, the initial value $X_i$ of the target value X, in some embodiments, might be described as min $(Q_R+T_H, Q_R+(Q_R-Q_L)$. In accordance with other embodiments, different criteria might be used to define the initial value of X A solution $Q_{NEW}$ then may be obtained for the best allocation of items for target X, using, for example, the subset-sum heuristic described above (block 160). $Q_{NEW}$ then may be evaluated. Merely by way of example, if $Q_{NEW}$ is equal to the requested quantity $Q_R$, at least to within an accepted precision (as indicated by decision block 165), it may be pointless to search for additional solutions, since $Q_{NEW}$ is an exact fit; hence, in some embodiments, Q may be defined as $Q_{NEW}$ (block 190) at this point. If, however, $Q_{NEW}$ is not equal to $Q_R$, $Q_{NEW}$ may be compared to previously-obtained values of $Q_{NEW}$, and the best solution among the values of $Q_{NEW}$ may be defined as $Q_H$ (block 170). (In this case, since this is the first iteration, $Q_{NEW}$ typically will be defined as $Q_H$, since no prior values of $Q_{NEW}$ exist for comparison).

Many comparison procedures are available, and any appropriate procedure may be used. Merely by way of example, one suitable procedure may be to save, going forward, a value of $Q_H$ that represents the best allocation (e.g., the fewest number of items). At each successive iteration, the value of $Q_{NEW}$ obtained in that iteration may be compared with the existing value for $Q_H$. If the current $Q_{NEW}$ is a better solution than the existing $Q_H$, the value of $Q_{NEW}$ may be saved as $Q_H$, and/or the prior value of $Q_H$ may be discarded. In other embodiments, all values of $Q_{NEW}$ may be saved (e.g., as members of a list, array, etc.) and then may be compared against one another after all iterations have been completed. Other comparison schemes may be used as well.

The value of $Q_H$, then, may be evaluated to determine whether it is less than (or, in some cases equal to) $Q_L$ (block 170). If so, this typically means that no further iterations will produce a better solution than the current $Q_H$ (or, for that matter, $Q_L$). Thus, iterating (as described in more detail below) may be unnecessary, and $Q_H$ may be compared with $Q_L$ (block 185), e.g., to determine the best fit among the two. The best allocation Q then may be defined as the better of these two values (block 190). (Of course, if the values of $Q_H$ and $Q_L$ are identical, that shared value typically will be used as the best allocation Q).

If, however, $Q_H$ remains greater than $Q_L$, the procedure may check to see whether the maximum number of iterations (e.g., as defined by the control value N) has been met (for example, by comparing I to N (block 180). If so, no more iterations should be performed, and the respective values of $Q_H$ and $Q_L$ may be compared (block 185) at this point, for instance as described above. If the maximum number of iterations has not been met, the iterative procedure may be repeated: The counter I may be reset (block 150), e.g., by incrementing I, and/or the target X may be reset (block 155).

Resetting the target X can comprise a variety of procedures. As noted above, in the first iteration, the target X may have been set to a value representing the requested quantity plus the upper tolerance ($Q_R+T_H$). In accordance with some embodiments, then, resetting X may comprise effectively reducing the $T_H$, thereby obtaining a solution within a tighter tolerance to the requested quantity $Q_R$. In a particular set of embodiments, for example, the target value X may be reset to a value equal to the previous target value minus the product of the upper tolerance divided by the number of iterations; that is, $$X - \frac{T_H}{N}.$$

Resetting the target value X in this fashion will ensure, for example, that the range between the requested quantity $Q_R$ and the maximum available quantity ($Q_R+T_H$) will be uniformly tested during the allowable number of iterations, since the first iteration will obtain the best solution for a target equal to the maximum allowable quantity ($Q_R+T_H$), and the last iteration will obtain the best solution for a target equal to the requested quantity $Q_R$, (which generally can be expected to be the same as the solution $Q_L$ obtained above).

It should be noted, of course, that other methods of resetting the target quantity X may be used as well. Merely by way of example, the target quantity might be reduced in each iteration in the following fashion:

$$X - \frac{T_H}{N-1},$$

which may be a more efficient procedure than that discussed in the preceding paragraph, since the last iteration will not obtain a solution for $Q_R$ (which already may have been obtained, as described above), but will instead obtain a solution for $$Q_R + \frac{T_H}{N},$$

which is one "step" above $Q_R$; this procedure, therefore, may eliminate a likely redundancy in the procedure above. As another example, if a value other than $Q_R+T_H$ was used as the initial target value (which could be denoted as $X_i$), the target value X may be reset to a value based on that initial target value $X_i$, such as $$X_i - \frac{X_i}{N} \text{ or } X_i - \frac{X_i}{N-1}.$$

As yet a further example, X may be reset to a value of min $$\left(X_i - \frac{X_i}{N-1}, Q_H - \Delta\right),$$

which, in some embodiments, may provide a more efficient process for converging on the original requested quantity $Q_R$.

In such embodiments, for example, Δ may be a relatively small value (such as, merely by way of example, the level of precision with which an item may be measured—as described above, for instance—and/or some arbitrary value), such that X is reset as described above, unless the best solution found thus far $Q_H$ is less than (or nearly less than) the value to which X otherwise would be reset, in which case X is reset to the value of $Q_H$, less a relatively small value Δ (which, as can be seen, prevents the heuristic from repeatedly producing this value $Q_H$ as a solution).

In further embodiments, other methods may be used to reset the target value X in each iteration. Merely by way of example, while some of the described procedures for resetting X discussed implement a linear progression (from $Q_R+T_H$ to $Q_R$, for example) for resetting the target value X, non-linear formulas may be used as well, depending on the circumstances and the desired results.

A solution may obtained for the reset target X (block 160), for example, as described above, and the procedure 130 may proceed as described above until all iterations have been completed and/or another exit condition (such as the conditions identified by blocks 165 and/or 175, a defined time limit, etc.) has been achieved. Merely by way of example, the system (and/or a user) could define a time limit (such as 10 seconds, etc.) as an additional exit condition, at which point, the system would stop executing the procedure 130 and, for example, return the best solution $Q_H$ found to that point.

Returning now to FIG. 1A, once a best solution Q has been obtained, the items represented by that solution may be allocated to the order (block 135). (It should be noted that, in accordance with some embodiments, a test may be performed at this point to validate the items to be allocated have not be consumed and/or allocated by a concurrent process. If one or more of the items to be allocated—i.e., items within the solution Q—have been otherwise consumed and/or allocated, the method 100 may be restarted to find a new best allocation; if not, the items within the best allocation Q may be allocated.) As noted above, allocating items to an order may comprise updating a WMS and/or an RDBMS to associate the items with the order, to indicate that the items have been allocated, etc. Allocating items may comprise selecting and/or grouping the items, packaging and/or shipping the items, etc. Such procedures may be performed in an automated fashion, manually by warehouse personnel, etc.

In situations in which the objective of the allocation routine is to allocate the fewest number of items to an order (e.g., within the defined tolerance), the method 100 as described thus far may be sufficient to produce an optimum allocation of items to the order. In other embodiments, however, it may be desirable to allocate items as precisely as possible to meet the requested quantity $Q_R$, and/or minimizing the number of items allocated may be a secondary consideration. In such cases, the procedure 130 for obtaining the best solution may first be implemented for a first group of available items (e.g., as defined by the grouping procedure described with respect to block 125). In some cases, for example, the first group of items may be a group of the largest items, as discussed above. If the solution Q obtained for this first group of items does not meet the allocation goals of the process (e.g., if Q does not fall within the lower tolerance $T_L$, does not produce an exact fit—e.g., to within an acceptable precision—for $Q_R$, etc.) the procedure 130 may be repeated for a second group of available items (e.g., the group of the next-largest items) to find a new solution Q, which then may also be allocated to the order (block 135). This process may be repeated with successive groups of items until, for example, the total number of allocated items meets the allocation goals and/or until all groups of available items have been analyzed.

Figure 2:
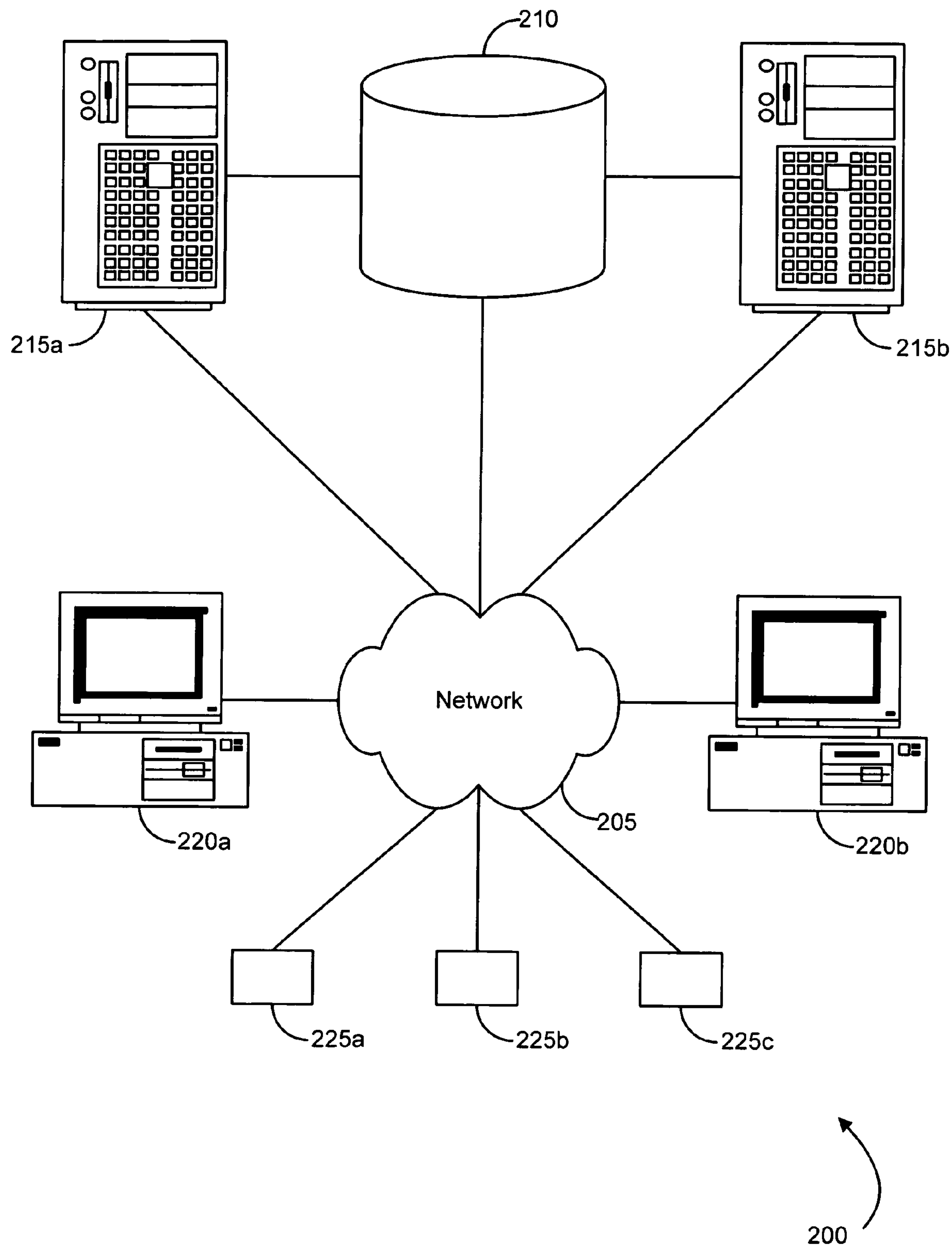
FIG. 2 is a schematic diagram illustrating a system for allocating items, in accordance with various embodiments of the invention.

Another set of embodiments provides systems for allocating items, including without limitation systems that can be configured to implement methods of the invention. FIG. 2 illustrates one exemplary system 200. The system 200 may operate in a networked environment, and therefore may comprise a network 205. The network 205 may can be any type of network familiar to those skilled in the art that can support data communications using any of a variety of commercially-available protocols, including without limitation TCP/IP, SNA™, IPX™, AppleTalk™, and the like. Merely by way of example, the network 105 maybe a local area network ("LAN"), such as an Ethernet network, a Token-Ring™ network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, any appropriate RFID protocol, the Bluetooth™ protocol known in the art, and/or any other wireless protocol); and/or any combination of these and/or other networks.

The system 200 also can include a database 210, which may be a relational database. The system 200 may also include one or more server computers 215, which can be general purpose computers and/or specialized server computers (including, merely by way of example, PC servers, UNIX servers, mid-range servers, mainframe computers rack-mounted servers, etc.). (Although FIG. 2 illustrates two server computers 215*a* and 215*b*, those skilled in the art will appreciate, based on the disclosure here, some embodiments will feature a single server computer, while other embodiments may include three or more server computers. Moreover, one skilled in the art will appreciate, based on the disclosure herein, that the functions described with respect to the server computers 215 could be divided and/or shared between such a plurality of server computers and/or could be implemented on a single server computer).

Each of the server computers 215 can feature an operating system including any of those discussed below, as well as any commercially-available server operating systems. As appropriate, the server computers 215 can also run any of a variety of server applications and/or mid-tier applications, including HTTP servers, FTP servers, CGI servers, database servers, Java servers, business applications, and the like. The server computers 215 also may be one or more computers which can be capable of executing programs or scripts (perhaps in response to input from a user computer 220, described below). As one example, a server computer 215 may execute one or more web applications, which can be configured to allow a user to interact with the database 210 and/or a warehouse management system. Such web applications may be implemented as one or more scripts or programs written in any programming language, such as Java™, C, C#™ or C++, and/or any scripting language, such as Perl, Python, or TCL, as well as combinations of any programming/scripting languages. The server(s) may also provide database services, perhaps through a relational database management system ("RDBMS"), including without limitation those commercially available from Oracle™, Microsoft™, Sybase™, IBM™ and the like, which can process requests from database clients running on a user computer 220 and/or can interact with the database 210 to implement methods of the invention.

In some cases, the software for performing methods of the invention (and/or certain components thereof) may be incorporated within any of these services. Merely by way of example, an RDBMS (and/or an RDBMS-based application, such as a WMS, enterprise resource planning application, etc.) may include the necessary components to allow a computer (such as one or more of the server computers 215) operating the RDBMS to manage items of inventory and/or allocate such items among orders, for instance, as described above. Merely by way of example, a set of embodiments provides a server 215 (which may be a plurality of servers) having an RDBMS (such as Oracle 10g™) and/or a WMS (such as Oracle Warehouse Management™) configured to perform methods of the invention. In some embodiments, for instance, the WMS may have a rules engine (including without limitation the rules engine described in U.S. patent application Ser. No. 10/158,176, already incorporated by reference) configured to implement methods of the invention, including without limitation the method 100 described in detail above.

In other embodiments, certain procedures may be performed by a freestanding application and/or by the operating system itself. Those skilled in the art will appreciate, based on the disclosure herein, that there are a wide variety of ways in which the methods of the invention may be implemented.

In particular embodiments, the server computer 215 may be in communication with the database 210. The database 210 may reside in a variety of locations. By way of example, the database 210 may reside on a storage medium local to (and/or resident in) one or more of the server computers 215. Alternatively, the database 210 may be remote from any or all of the computers, and/or may be in communication (e.g., via the network 205) with one or more of these. In a particular set of embodiments, the database 210 may reside in a storage-area network ("SAN") familiar to those skilled in the art. Similarly, any necessary files for performing the functions attributed to the computers 220 described below may be stored locally on the respective computer/devices and/or remotely, as appropriate. In one set of embodiments, as mentioned above, the database may be a relational database, such as Oracle 10g™, that is adapted to store, update, and retrieve data in response to SQL-formatted commands. The database may store data necessary to implement the methods of the invention, including without limitation data about items in inventory, orders to be fulfilled or otherwise processed, etc.

As mentioned above, the system 200 may also include one or more user computers 220, which can be a general purpose personal computer (including, merely by way of example, a personal computer and/or laptop computer running various versions of Microsoft Corp.'s Windows™ and/or Apple Corp.'s Macintosh™ operating systems) and/or workstation computers running any of a variety of commercially-available UNIX™ or UNIX-like operating systems (including without limitation the variety of available GNU/Linux operating systems). The user computers 220 may also have any of a variety of applications, including one or more development systems, database client and/or server applications, web browser applications, etc. In particular, the user computers 220 may interact with the database 210 and/or the servers 215. Such interactions can include viewing and/or manipulating the data stored in the database 210 a program (such as a WMS, RDBMS, etc.) on the server computers 215. In alternative embodiments, one or more of the user computers 220 may be any other electronic device, such as a thin-client computer, Internet-enabled mobile telephone, and/or personal digital assistant, capable of communicating with the server computer 215 and/or the database 210 (e.g., via the network 205) and/or displaying and navigating web pages or other types of electronic documents. Although the exemplary system 200 is shown with two user computers 220*a* and 220*b*, any number of user computers may be supported.

The system 200 may also include one or more devices 225 configured to enable warehouse management functions of various embodiments of the invention. Such devices 225 can include, merely by way of example, bar code scanners (which can allow, for example, the use of license plate numbers ("LPN") to provide sophisticated tracking of various items of inventory), printers, such as label printers, etc., material handling systems, such as storage and retrieval systems, carousels, packaging machines, etc.

Figure 3:
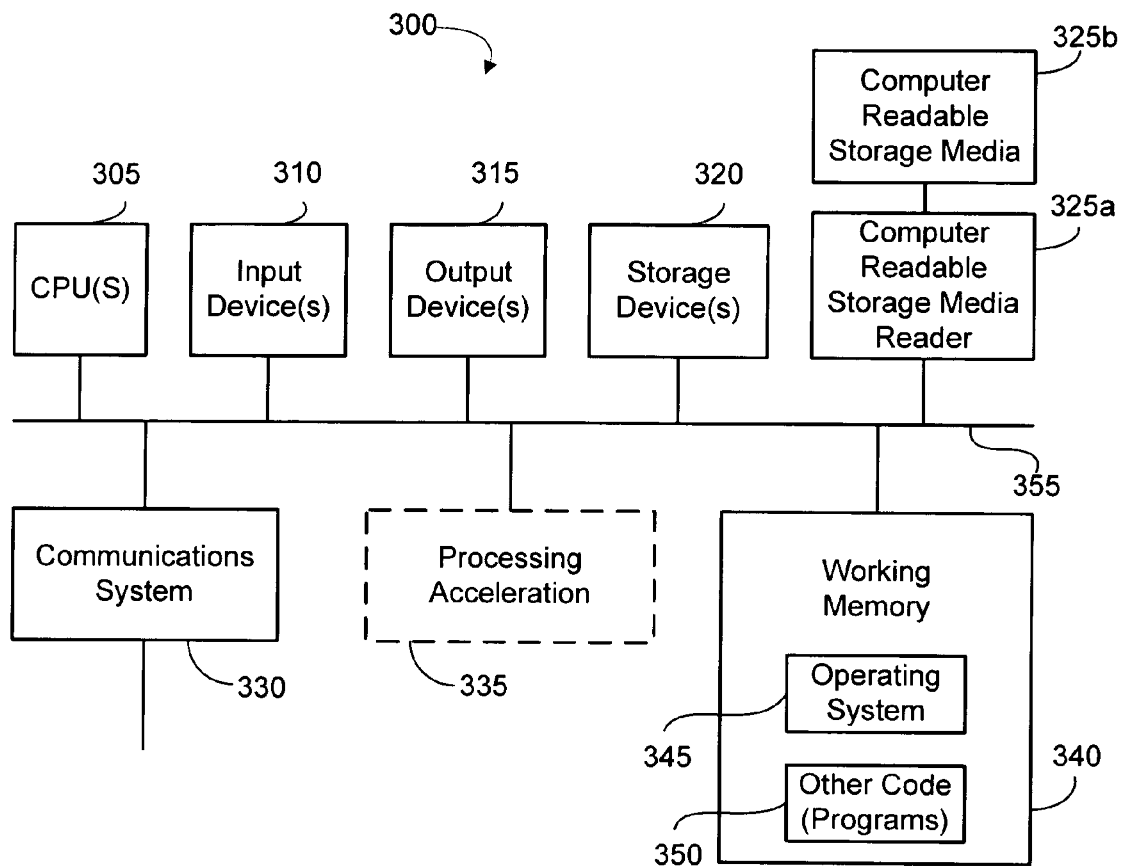
FIG. 3 is a generalized schematic diagram illustrating a computer system that may be used in accordance with various embodiments of the invention.

As noted above, in accordance with certain embodiments, standard computers and/or devices may be configured for use in the system 200 and/or to implement methods of the invention. FIG. 3 provides a general illustration of one embodiment of a computer system 200, which may be exemplary of any of the computers/devices described above. The computer system 300 is shown comprising hardware elements that may be electrically coupled via a bus 355. The hardware elements may include one or more central processing units (CPUs) 305; one or more input devices 310 (e.g., a mouse, a keyboard, etc.); and/or one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325*a*; a communications system 330 (e.g., a modem, a network card (wireless or wired), an infra-red communication device, etc.); and working memory 340, which may include RAM and ROM devices as described above. In some embodiments, the computer system 300 may also include a processing acceleration unit 335, which can include a DSP, a special-purpose processor and/or the like The computer-readable storage media reader 325*a* can further be connected to a computer-readable storage medium 325*b*, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with the network 205 and/or any other computer described above with respect to the system 200.

The computer system 300 may also comprise software elements, shown as being currently located within a working memory 340, including an operating system 345 and/or other code 350, such as one or more application programs (which may be an application, etc., configured to perform procedures in accordance with embodiments of the invention, as well as a client application, web browser, mid-tier application, RDBMS, etc.). The application programs may be designed to implement methods of the invention.

It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Hence, various embodiments of the invention provide systems that may be configured to implement methods of the invention, including without limitation the methods described with respect to FIGS. 1A and 1B. It should be noted the described methods and systems are intended to be only exemplary in nature. Consequently, various embodiments may omit, substitute and/or add various procedures and/or components as appropriate.

Similarly, in the foregoing description, for the purposes of illustration, various methods were described in a particular order. It should be appreciated that in alternative embodiments, the methods may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods described above. In particular embodiments, for example, there may be a plurality of software components configured to execute on various hardware devices (such as a user computer, a server computer, a sensing device, etc.). Alternatively, the methods may be performed by a combination of hardware and software.

Hence, various embodiments of the invention provide inventive methods, systems, software products and data structures for managing items, particularly in a warehouse environment. Other embodiments, however can implement methods, procedures and/or systems of the invention to manage and/or allocate a wide variety of resources, in any of a variety of contexts. Merely by way of example, embodiments of the invention could be used for allocating materials to one or more manufacturing jobs, or for that matter, to any application where scarce resources need to be assigned or allocated to discrete tasks, jobs, orders, etc. Examples include the allocation of time to particular tasks, scheduling processes, allocation of manpower, etc. Hence, while the description above identifies certain exemplary embodiments for implementing the invention, those skilled in the art will recognize that many modifications and variations are possible within the scope of the invention. The invention, therefore, is defined only by the claims set forth below

What is claimed is:

1. In a warehouse environment, a method of allocating items to an order, the method comprising:

identifying an order, the order comprising a requested quantity of a bulk material;

determining a tolerance for the order, the tolerance defining a variation from the requested quantity of the material, wherein a quantity within the tolerance is still acceptable for the order;

identifying a set of items, the set of items comprising a plurality of items available for allocation, each of the plurality of items comprising some variable quantity of the bulk material;

calculating with a computer a first allocation of one or more of the plurality of items available for allocation, wherein the first allocation is based on the requested quantity and the variable quantity of the bulk material of each of the plurality of items available for allocation;

calculating with the computer a second allocation of one or more of the plurality items available for allocation, wherein the second allocation is based on a target value within the tolerance and the variable quantity of the bulk material of each of the plurality of items available for allocation;

comparing the first allocation with the second allocation to find a best allocation of items; and allocating the best allocation of items to the order.

2. A method of allocating items to an order as recited in claim 1, wherein calculating a first allocation of one or more of the plurality of items comprises calculating a first allocation using a subset-sum heuristic.

3. A method of allocating items to an order as recited in claim 1, wherein calculating a second allocation of one or more of the plurality of items comprises calculating a second allocation using a subset-sum heuristic.

4. A method of allocating items to an order as recited in claim 1, wherein comparing the first allocation with the second allocation comprises determining which, of the first allocation and the second allocation, comprises a fewest number of items.

5. A method of allocating items to an order as recited in claim 1, wherein comparing the first allocation with the second allocation comprises determining which, of the first allocation and the second allocation, comprises a quantity of the bulk material closest to the requested quantity of the bulk material.

6. A method of allocating items to an order as recited in claim 1, wherein the target value is a sum of the requested quantity and the tolerance.

7. A method of allocating items to an order as recited in claim 6, wherein calculating a second allocation of one or more of the plurality of items further comprises:

(a) resetting the target value; and (b) calculating an alternative allocation of one or more of the plurality of items, based on the reset target value.

8. A method of allocating items to an order as recited in claim 7, wherein calculating a second allocation of one or more of the plurality of items further comprises:

iteratively performing (a) and (b) to produce a plurality of alternative allocations of one or more of the plurality of items; and selecting as the second allocation a best of the plurality of alternative allocations.

9. A method of allocating items to an order as recited in claim 8, further comprising:

controlling a number of iterations of (a) and (b) with a control value, such that the number of iterations does not exceed the control value.

10. A method of allocating items to an order as recited in claim 9, wherein resetting the target value comprises adjusting the target value by an amount calculated from the control value.

11. A method of allocating items to an order as recited in claim 1, wherein identifying a set of items comprises identifying a set of items based on a rule implemented by a rules engine of a warehouse management system.

12. A method of allocating items to an order as recited in claim 1, wherein identifying a set of items comprises searching a database for available items.

13. A method of allocating items to an order as recited in claim 1, wherein determining a tolerance for the order comprises identifying a tolerance specified by the order.

14. A method of allocating items to an order as recited in claim 1, wherein determining a tolerance for the order comprises implementing a tolerance defined by a rules engine of a warehouse management system.

15. A method of allocating items to an order as recited in claim 1, wherein the tolerance is an absolute quantity of the bulk material.

16. A method of allocating items to an order as recited in claim 1, wherein the tolerance is a quantity of the bulk material relative to the requested quantity.

17. A method of allocating items to an order as recited in claim 1, further comprising:

grouping the plurality of items available for allocation into a plurality of groups, the plurality of groups comprising at least a first group of items and a second group of items.

18. A method of allocating items to an order as recited in claim 17, wherein:

calculating a first allocation comprises calculating a first allocation of items from among the first group of items; and calculating a second allocation comprises calculating a second allocation of items from among the first group of items; and allocating a best allocation of items to the order comprises allocating to the order a best allocation from among the first group of items.

19. A method of allocating items to an order as recited in claim 17, wherein grouping the plurality of items available for allocation comprises:

forming a first group of items, the first group comprising a first plurality of items, wherein each of the first plurality of items comprises a quantity of the bulk material greater than a first threshold value; and forming a second group of items, the second group comprising a second plurality of items, wherein each of the second plurality of items comprises a quantity of the bulk material greater than a second threshold value but not greater than the first threshold value.

20. A method of allocating items to an order as recited in claim 18, further comprising:

allocating to the order a best allocation from among the second group of items.

21. A method of allocating items to an order as recited in claim 20, wherein allocating to the order a best allocation from among the second group of items comprises:

calculating with a computer a third allocation of one or more of the plurality of items available for allocation from among the second group of items, wherein the third allocation is based on the requested quantity;

calculating with the computer a fourth allocation of one or more of the plurality items available for allocation from among the second group of items, wherein the fourth allocation is based on a target value within the tolerance;

comparing the third allocation with the fourth allocation to find a best allocation from among the second group of items; and allocating to the order the best allocation from among the second group of items.

22. A method of allocating items to an order as recited in claim 18, wherein the plurality of groups of items comprises a plurality of additional groups of items other than the first group and the second group, the method further comprising:

allocating, until an exit condition has been attained, a best allocation from among each of the plurality of additional groups of items.

23. A method of allocating items to an order as recited in claim 22, wherein the exit condition comprises allocating the requested quantity of the bulk material.

24. A method of allocating items to an order as recited in claim 22, wherein the exit condition comprises allocating a quantity of the bulk material within the tolerance.

25. The method of claim 1, wherein the variable quantity of the bulk material varies by weight of by size.

26. The method of claim 25, wherein the tolerance defines a variation from the requested quantity of the bulk material in terms of an absolute quantity or a percentage.

27. A system for allocating items to an order, the system comprising one or more computers configured to:

identify an order, the order comprising a requested quantity of a bulk material;

determine a tolerance for the order, the tolerance defining a variation from the requested quantity of the bulk material, wherein a quantity within the tolerance is still is acceptable for the order;

identify a set of items, the set of items comprising a plurality of items available for allocation, each of the plurality of items comprising some variable quantity of the bulk material;

calculate a first allocation of one or more of the plurality of items available for allocation, wherein the first allocation is based on the requested quantity and the variable quantity of the bulk material of each of the plurality of items available for allocation;

calculate a second allocation of one or more of the plurality items available for allocation, wherein the second allocation is based on a target value within the tolerance and the variable quantity of the bulk material of each of the plurality of items available for allocation;

compare the first allocation with the second allocation to find a best allocation of items; and allocate the best allocation of items to the order.

28. A system for allocating items to an order as recited in claim 27, the system further comprising:

a database;

wherein at least one of the one or more computers comprises:

a relational database management system in communication with the database; and a warehouse management system in communication with the relational database management system.

29. A software program embodied on a computer readable medium, the software program comprising instructions executable by one or more computers to:

identify an order, the order comprising a requested quantity of a bulk material;

determine a tolerance for the order, the tolerance defining a variation from the requested quantity of the bulk material, wherein a quantity within the tolerance is still is acceptable for the order;

identify a set of items, the set of items comprising a plurality of items available for allocation, each of the plurality of items comprising some variable quantity of the bulk material;

calculate a first allocation of one or more of the plurality of items available for allocation, wherein the first allocation is based on the requested quantity and the variable quantity of the bulk material of each of the plurality of items available for allocation;

calculate a second allocation of one or more of the plurality items available for allocation, wherein the second allocation is based on a target value within the tolerance and the variable quantity of the bulk material of each of the plurality of items available for allocation;

compare the first allocation with the second allocation to find a best allocation of items; and allocate the best allocation of items to the order.

* * * * *

UNITED STATES PATENT AND TRADEMARK OFFICE

CERTIFICATE OF CORRECTION

PATENT NO. : 7,930,050 B2
APPLICATION NO. : 11/021860
DATED : April 19, 2011
INVENTOR(S) : Wertheimer It is certified that error appears in the above-identified patent and that said Letters Patent is hereby corrected as shown below:

In column 3, line 58, after "itself" insert -- . --.

In column 11, line 21, after "X" insert -- . --.

In column 16, line 38, after "like" insert -- . --.

In column 17, line 48, after "below" insert -- . --.

In column 18, line 2, in Claim 1, after "plurality" insert -- of --.

In column 19, line 47, in Claim 21, after "plurality" insert -- of --.

In column 20, line 23, in Claim 27, after "plurality" insert -- of --.

In column 20, line 56, in Claim 29, after "plurality" insert -- of --.

Signed and Sealed this
Fourth Day of October, 2011

David J. Kappos

David J. Kappos
*Director of the United States Patent and Trademark Office*